United States Patent
Inaguma et al.

(10) Patent No.: US 10,232,362 B2
(45) Date of Patent: Mar. 19, 2019

(54) HONEYCOMB CORE FOR CARRYING CATALYST AND CATALYTIC CONVERTER

(71) Applicant: NIPPON STEEL & SUMIKIN MATERIALS CO., LTD., Tokyo (JP)

(72) Inventors: Tooru Inaguma, Tokyo (JP); Yasuhiro Tsumura, Tokyo (JP); Shogo Konya, Tokyo (JP); Masayuki Kasuya, Tokyo (JP); Masafumi Omizu, Tokyo (JP)

(73) Assignee: NIPPON STEEL & SUMIKIN MATERIALS CO., LTD., Tokyo (JP)

( * ) Notice: Subject to any disclaimer, the term of this patent is extended or adjusted under 35 U.S.C. 154(b) by 0 days.

(21) Appl. No.: 15/758,638

(22) PCT Filed: Dec. 27, 2016

(86) PCT No.: PCT/JP2016/088986
§ 371 (c)(1),
(2) Date: Mar. 8, 2018

(87) PCT Pub. No.: WO2017/119375
PCT Pub. Date: Jul. 13, 2017

(65) Prior Publication Data
US 2018/0243734 A1   Aug. 30, 2018

(30) Foreign Application Priority Data
Jan. 8, 2016   (JP) .................................. 2016-002720

(51) Int. Cl.
*B01J 21/04*   (2006.01)
*B01J 23/02*   (2006.01)
(Continued)

(52) U.S. Cl.
CPC .............. *B01J 35/04* (2013.01); *B01D 53/94* (2013.01); *B01J 23/63* (2013.01); *F01N 3/281* (2013.01);
(Continued)

(58) Field of Classification Search
CPC . B01J 35/04; B01J 23/63; F01N 3/281; F01N 3/2814; F01N 2450/22; F01N 2330/04; F01N 2330/02; B01D 53/94
(Continued)

(56) References Cited

U.S. PATENT DOCUMENTS

| 5,068,218 A | 11/1991 | Nishizawa |
| 6,761,857 B1 | 7/2004 | Takahashi et al. |

(Continued)

FOREIGN PATENT DOCUMENTS

| JP | H03-004938 A | 1/1991 |
| JP | H04-180839 A | 6/1992 |

(Continued)

OTHER PUBLICATIONS

Machine translation of JP2011/156505A (Year: 2011).*
(Continued)

*Primary Examiner* — Haytham Soliman
(74) *Attorney, Agent, or Firm* — Manabu Kanesaka

(57) ABSTRACT

A honeycomb core for carrying a catalyst includes a flat metal foil and a corrugated metal foil, which are layered. The corrugated foil is configured by repeating a concavo-convex shaped part including a first top surface that is in contact with one of the flat foils, a second top surface that is in contact with another flat foil and is disposed at a position where the second top surface avoids the first top surface, and an inclined leg surface that has one end connected to the first top surface through a first bent part and another end connected to the second top surface through a second bent part, and extends in a direction inclined with respect to the first top surface and the second top surface, and has an offset part having different wave phases between front and rear in an axial direction of the honeycomb core.

20 Claims, 7 Drawing Sheets

(51) Int. Cl.
  *B01J 35/04* (2006.01)
  *B01J 23/63* (2006.01)
  *B01D 53/94* (2006.01)
  *F01N 3/28* (2006.01)

(52) U.S. Cl.
  CPC ........ *F01N 3/2814* (2013.01); *F01N 2330/02* (2013.01); *F01N 2330/04* (2013.01); *F01N 2450/22* (2013.01)

(58) Field of Classification Search
  USPC ........................................................ 502/439
  See application file for complete search history.

(56) References Cited

U.S. PATENT DOCUMENTS

| | | |
|---|---|---|
| 2003/0012974 A1 | 1/2003 | Iwami et al. |
| 2004/0258943 A1 | 12/2004 | Takahashi et al. |

FOREIGN PATENT DOCUMENTS

| | | | |
|---|---|---|---|
| JP | H11-050840 A | | 2/1999 |
| JP | H11-253753 A | | 9/1999 |
| JP | 2000-334313 A | | 12/2000 |
| JP | 2001-96170 A | | 4/2001 |
| JP | 2001-207835 A | | 8/2001 |
| JP | 2011156505 A | * | 8/2011 |

OTHER PUBLICATIONS

PCT International Search Report of PCT/JP2016/088986 "PCT/ISA/210" dated Feb. 7, 2017.
PCT Opinion of PCT/JP2016/088986 "PCT/ISA/237" in Japanese dated Feb. 7, 2017.
PCT/IB/338, "Notification of Transmittal of Translation of the International Preliminary Report on Patentability for International Application No. PCT/JP2016/088986," dated Jul. 19, 2018.
PCT/IB/373, "International Preliminary Report on Patentability for International Application No. PCT/JP2016/088986," dated Jul. 10, 2018.
PCT/ISA/237, "Written Opinion of the International Searching Authority for International Application No. PCT/JP2016/088986," dated Feb. 7, 2017.

* cited by examiner

AXIAL DIRECTION P

LAYERING DIRECTION Q

HONEYCOMB CORE FOR CARRYING CATALYST AND CATALYTIC CONVERTER

RELATED APPLICATIONS

The present application is National Phase of International Application No. PCT/JP2016/088986 filed Dec. 27, 2016, and claims priority from Japanese Application No. 2016-002720, filed Jan. 8, 2016, the disclosure of which is hereby incorporated by reference herein in its entirety.

TECHNICAL FIELD

The present invention relates to a honeycomb core for carrying a catalyst and a catalytic converter that are used for purifying exhaust gas emitted from an internal combustion engine or the like of an automobile.

BACKGROUND ART

A catalytic converter for purifying exhaust gas that carries a catalyst is used to purify a problematic gas component, which impairs the human body when it is emitted in the air, such as HC (hydrocarbon), CO (carbon monoxide), and NOx (nitrogen compound).

Such a catalytic converter is used in purification of exhaust gas from an automobile and a motorbike. In order to purify exhaust gas from an internal combustion engine, a catalytic converter carrying a catalyst is disposed in an exhaust gas flow channel. The catalytic converter carrying a catalyst is similarly used in a methanol reformer that reforms hydrocarbon compounds such as methanol with steam to generate hydrogen-rich gas, a CO remover that reforms CO into $CO_2$ to remove CO, and an $H_2$ combustion device that burns $H_2$ into $H_2O$ to remove $H_2$.

Such a catalytic converter is configured so that a honeycomb core obtained by winding a flat metal foil and a corrugated metal foil is partially joined to an outer jacket covering the outer circumferential surface of the honeycomb core in the radial direction. The honeycomb core has a large number of exhaust gas flow channels extending in the axial direction. Exhaust gas can be purified by allowing the exhaust gas to flow through the inside of the exhaust gas flow channels from an end surface on an inlet side toward an end surface on an outlet side of the honeycomb core.

As such a catalytic converter, a catalytic converter including a honeycomb core having a flat metal foil and a corrugated metal foil that are alternately laminated, wherein a large number of exhaust gas flow channels for allowing exhaust gas to pass therethrough are formed and extend in an axial direction and an offset structure having different phases of adjacent wave parts between the front and rear in the axial direction is provided is known (for example, see Patent Literature 1). FIG. 11 is a cross-sectional view in a part of a conventional corrugated foil. One wave part 100 of adjacent wave parts in the axial direction is shown by a solid line, and another wave part 100' is shown by a dotted line. With reference to FIG. 11, the wave part 100 includes a top surface 101, and a pair of side surfaces 102 extending from both ends of the top surface 101 in an obliquely downward direction. A lower end part is in contact with a flat foil 200, and a connection part between the top surface 101 and each of the side surfaces 102 is angular.

As viewed in an axial direction (normal direction of a sheet surface), a side surface 102' of the wave part 100' extends toward a region corresponding to the inside of the wave part 100. Thus, the corrugated foil has an offset structure. Due to use of the offset structure, the flow of exhaust gas is changed from laminar flow to turbulent flow, and an action of stirring exhaust gas is caused. Therefore, the purification performance for exhaust gas can be enhanced.

CITATION LIST

Patent Literature

Patent Literature 1: JP2001-96170
Patent Literature 2: JPH11-50840

SUMMARY OF INVENTION

Technical Problem

However, when the offset structure is used, the pressure loss of exhaust gas during passing through the catalytic converter is increased. The inventor of the present invention has studied the exhaust gas purification performance and pressure loss of the catalytic converter having the offset structure of FIG. 11 in detail. As a result, the inventor has found that turbulent flow that does not contribute to the purification performance is generated in the connection part (a region T shown by hatching) between the top surface 101 and each of the side surfaces 102, to increase the pressure loss. Turbulent flow that contributes to purification should be allowed, but the turbulent flow that does not contribute to purification only causes the pressure loss. Therefore, the turbulent flow that does not contribute to purification should be decreased as much as possible.

On the other hand, the amount of the catalyst applied to each cell of the catalytic converter may be previously restricted to a constant amount. In this case, when the catalyst is applied to a region that does not contribute to purification of exhaust gas, the amount of the catalyst applied to a region that contributes to purification of exhaust gas decreases. Therefore, the purification performance of the catalytic converter is deteriorated.

In an offset structure in which a cross section of each of the exhaust gas flow channels is square, sufficient purification performance is not achieved.

Therefore, an object of the invention of the present application is to suppress the generation of turbulent flow that does not contribute to the purification of exhaust gas to decrease the pressure loss, and to decrease the amount of the catalyst applied to the region that does not contribute to the purification of exhaust gas.

Solution to Problem

In order to achieve the above-described object, the invention of the present application provides as follows. (1) A honeycomb core for carrying a catalyst including a flat metal foil and a corrugated metal foil, the flat metal foil and the corrugated metal foil being layered, wherein the corrugated foil is configured by repeating a concavo-convex shaped part including a first top surface that is in contact with one of the flat foils adjacent in a layering direction, a second top surface that is in contact with another flat foil adjacent in the layering direction and is disposed at a position where the second top surface avoids the first top surface as viewed in the layering direction, and an inclined leg surface that has one end connected to the first top surface through a first bent part and another end connected to the second top surface through a second bent part, and extends in a direction inclined with respect to the first top surface and the second top surface, and has an offset part having different wave phases between the front and rear in an axial direction of the honeycomb core, the first bent part and the second bent part each have a R shape, a radius of curvature R1 of an inner edge of the first bent part and a radius of curvature R2 of an inner edge of the second bent part satisfy the following conditional expressions (1) and (2), respectively, and a separation distance h in the layering direction between the first top surface and the second top surface and a separation distance S between a pair of the inclined leg surfaces connected to the first top surface through the first bent parts satisfy the following conditional expression (3):

$$0.02 \text{ (mm)} \leq R1 \leq 2.0 \text{ (mm)} \tag{1},$$

$$0.02 \text{ (mm)} \leq R2 \leq 2.0 \text{ (mm)} \tag{2, and}$$

$$1.5 \leq S/h \leq 10 \tag{3}.$$

(2) The honeycomb core for carrying a catalyst according to (1), wherein a first protrusion extends from both ends in the axial direction of the first bent part toward an exhaust gas flow channel that is disposed between the first top surface and the other flat foil as viewed in the axial direction, and a second protrusion extends from both ends in the axial direction of the second bent part toward an exhaust gas flow channel that is disposed between the second top surface and the one flat foil as viewed in the axial direction.

(3) The honeycomb core for carrying a catalyst according to (2), wherein a protrusion length B1 of the first protrusion and a protrusion length B2 of the second protrusion satisfy the following conditional expressions (4) and (5), respectively:

$$2 \text{ (μm)} \leq B1 \leq 45 \text{ (μm)} \tag{4, and}$$

$$2 \text{ (μm)} \leq B2 \leq 45 \text{ (μm)} \tag{5}.$$

(4) The honeycomb core for carrying a catalyst according to any one of (1) to (3), wherein an inclination α of the inclined leg surface with respect to the layering direction satisfies the following conditional expression (6):

$$0.5° \leq \alpha \leq 15° \tag{6}.$$

(5) The honeycomb core for carrying a catalyst according to any one of (1) to (4), wherein a length L of the concavo-convex shaped part in the axial direction satisfies the following conditional expression (7):

$$0.5 \text{ (mm)} \leq L \leq 20 \text{ (mm)} \tag{7}.$$

(6) The honeycomb core for carrying a catalyst according to any one of (1) to (5), wherein the S is 0.5 (mm) or more and 10 (mm) or less, and the flat foil and the corrugated foil have a thickness of 5 (μm) or more and 100 (μm) or less.

(7) The honeycomb core for carrying a catalyst according to any one of (1) to (6), wherein the concavo-convex shaped parts are arranged in a zigzag pattern in the axial direction.

(8) A catalytic converter including the honeycomb core for carrying a catalyst according to any one of (1) to (7), a catalyst carried on the honeycomb core for carrying a catalyst, and an outer metal cylinder surrounding an outer circumference surface of the honeycomb core for carrying a catalyst.

Advantageous Effects of Invention

According to the invention of the present application, when the radius of curvature R1 of the first bent part is set to 0.02 (mm) or more, the generation of turbulent flow that does not contribute to purification near the first bent part in an exhaust gas flow channel that is formed by the first top surface and the inclined leg surface can be suppressed. When the radius of curvature R1 of the first bent part is set to 2.0 (mm) or less, the attachment of unnecessary catalyst that does not contribute to purification near the first bent part in an exhaust gas flow channel that is formed by the second top surface and the inclined leg surface can be suppressed.

According to the invention of the present application, when the radius of curvature R2 of the second bent part is set to 0.02 (mm) or more, the generation of turbulent flow that does not contribute to purification near the second bent part in the exhaust gas flow channel that is formed by the second top surface and the inclined leg surface can be suppressed. When the radius of curvature R2 of the second bent part is set to 2.0 (mm) or less, the attachment of unnecessary catalyst that does not contribute to purification near the second bent part in the exhaust gas flow channel that is formed by the first top surface and the inclined leg surface can be suppressed.

DESCRIPTION OF EMBODIMENTS

Figure 1:
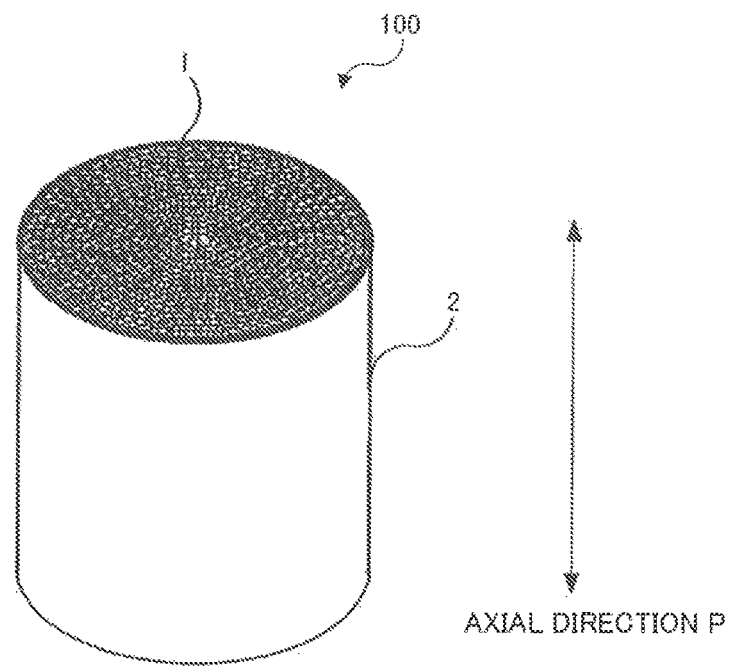
FIG. 1 is a perspective view of a catalytic converter.

The present embodiment will be described below on the basis of the drawings. FIG. 1 is a perspective view of a catalytic converter according to the present embodiment. An arrow P shows an axial direction of a honeycomb core (direction in which exhaust gas flows). The definition of the arrow P is also applicable to other drawings.

A catalytic converter 100 includes a honeycomb core 1 for carrying a catalyst and an outer metal cylinder 2 surrounding an outer circumference surface of the honeycomb core 1. The honeycomb core 1 is configured so that a flat foil 3 and a corrugated foil 4 are laminated and wound around an axial direction P. A large number of cells as exhaust gas flow channels are formed between the flat foil 3 and the corrugated foil 4. Exhaust gas can be purified by allowing the exhaust gas to flow through the inside of the cells. For the flat foil 3 and the corrugated foil 4, a heat-resistant metal can be used.

As the heat-resistant metal, for example, various heat-resistant stainless steels containing Al can be used. The stainless steels of this type usually contain 15 to 25% by mass of Cr and 2 to 8% by mass of Al. For example, a Fe-20Cr-5Al alloy, a Fe-20Cr-8Al alloy, or a Fe-18Cr-3Al alloy can be used. For example, the catalytic converter 100 can be disposed in an exhaust gas flow channel of a vehicle. The vehicle may be a gasoline vehicle or a diesel vehicle.

The cross section of the catalytic converter 100 is not limited to a circle. For example, the cross section may be another shape such as an ellipse, an oval, or a racetrack (hereinafter referred to as RT). In this embodiment, the honeycomb core 1 is configured so that the flat foil 3 and the corrugated foil 4 are laminated and wound around the axial direction P. However, the present invention is not limited to the embodiment, and can be applied to a rectangular honeycomb core in which the flat foil 3 and the corrugated foil 4 are alternately layered in one direction.

Figure 2:
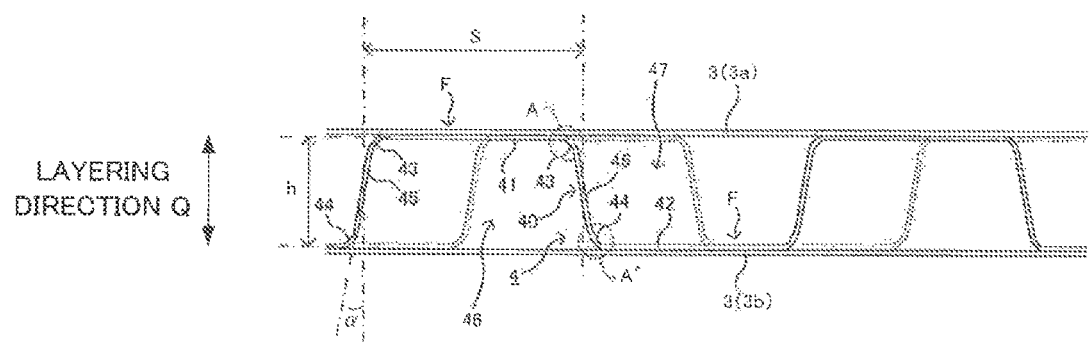
FIG. 2 is a cross-sectional view in a part of a corrugated foil and a flat foil that are cut in a direction orthogonal to an axial direction of a honeycomb core.
Figure 3:
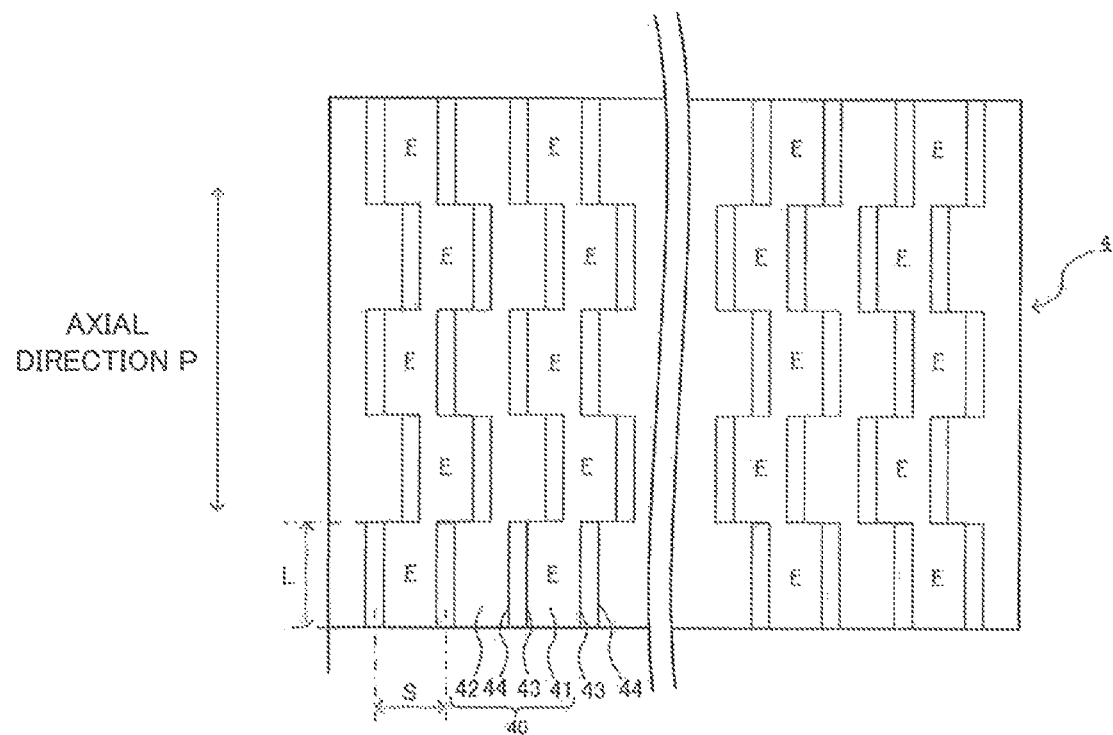
FIG. 3 is a development view in a part of the corrugated foil, which is a schematic view of the corrugated foil as viewed in a thickness direction.

FIG. 2 is a cross-sectional view in a part of the corrugated foil and the flat foil that are cut in a direction orthogonal to the axial direction of the honeycomb core 1. An arrow Q direction is a layering direction of the corrugated foil and the flat foil. FIG. 3 is a development view in apart of the corrugated foil, which is a schematic view of the corrugated foil as viewed in a thickness direction. With reference to FIGS. 2 and 3, the corrugated foil 4 is configured so that a concavo-convex shaped part 40 is repeated. The concavo-convex shaped part 40 is formed inside a space defined between the flat foils 3 adjacent in the layering direction Q, and includes a first top surface 41, a second top surface 42, a first bent part 43, a second bent part 44, and an inclined leg surface 45.

The first top surface 41 is in contact with one of the flat foils 3 (hereinafter referred to as a flat foil 3a), and is provided intermittently in an approximately circumferential direction of the honeycomb core 1. Specifically, a space is formed between the first top surfaces 41 adjacent in the circumferential direction of the honeycomb core 1. The second top surface 42 is in contact with the other of the flat foils 3 adjacent to the flat foil 3a (hereinafter referred to as a flat foil 3b), and is provided at a position facing to the space formed between the adjacent first top surfaces 41. Specifically, the second top surface 42 is disposed at a position where the second top surface 42 avoids the first top surface 41 as viewed in the layering direction Q.

In the aforementioned configuration, an exhaust gas flow channel 46 (corresponding to an exhaust gas flow channel disposed between the first top surface and the other flat foil) that allows exhaust gas to flow through the inside of a fin F formed by the first top surface 41, the first bent part 43, the second bent part 44, the inclined leg surface 45, and the flat foil 3b can be formed. Further, an exhaust gas flow channel 47 (corresponding to an exhaust gas flow channel disposed between the second top surface and the one flat foil) that allows exhaust gas to flow through the inside of a fin F formed by the second top surface 42, the first bent part 43, the second bent part 44, the inclined leg surface 45, and the flat foil 3a can be formed.

Herein, the fins F are arranged in a zigzag pattern in the axial direction P. Specifically, in the corrugated foil 4 of this embodiment, an offset structure in which the fins F are arranged across a straight line extending in a flow direction of exhaust gas is adopted. Therefore, on an extension of an exhaust gas flow channel formed by a fin F adjacent in the exhaust gas flow direction, the inclined leg surface 45 of another fin F is disposed. Accordingly, exhaust gas flowing through the exhaust gas flow channel collides with the inclined leg surface 45, and as a result, turbulent flow can be generated. Due to the use of the offset structure, the flow of exhaust gas is changed from laminar flow to turbulent flow, and a larger amount of exhaust gas is likely to collide with a catalyst. Therefore, the purification performance can be enhanced.

The first bent part 43 has an R shape at a position where the first top surface 41 and the inclined leg surface 45 are joined. The center of curvature of the first bent part 43 is positioned inside the exhaust gas flow channel 46 formed between the first top surface 41 and the flat foil 3b. When the radius of curvature of the first bent part 43 is represented by R1, the radius of curvature R1 satisfies the following conditional expression (1), and preferably the following conditional expression (1)'. The radius of curvature R1 is the radius of curvature of an inner edge of the first bent part 43.

$$0.02 \text{ (mm)} \leq R1 \leq 2.0 \text{ (mm)} \tag{1}$$

$$0.1 \text{ (mm)} \leq R1 \leq 1.0 \text{ (mm)} \tag{1}'$$

Figure 4:
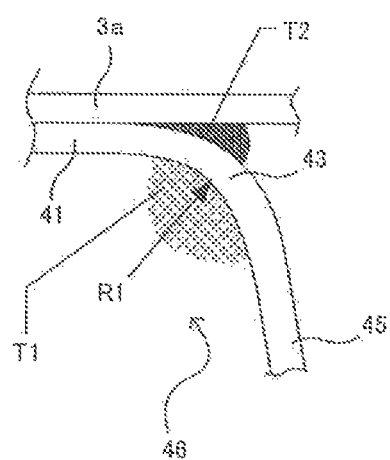
FIG. 4 is an enlarged view of a region A in FIG. 2 surrounded by a circle with a dotted line.

With reference to FIG. 4, a reason of limitation of the radius of curvature R1 will be described. FIG. 4 is an enlarged view of a region A in FIG. 2 surrounded by a circle with a dotted line. However, a first protrusion described below is omitted in this figure. When the radius of curvature R1 is set to 0.02 (mm) or more, the generation of turbulent flow that does not contribute to enhanced purification performance at an upper corner part in the inside of the exhaust gas flow channel 46 formed between the first top surface 41 and the flat foil 3b, that is, in a region T1 near the first bent part 43 shown by hatching, is suppressed. Therefore, the pressure loss can be decreased without deterioration of purification performance.

When the honeycomb core 1 is immersed in a catalyst bath, the catalyst remains at an upper corner part in the inside of the exhaust gas flow channel 47 formed between the flat foil 3a and the second top surface 42, that is, in a region T2 between the first bent part 43 and the flat foil 3a, shown by hatching. However, the region T2 is a region that does not contribute to purification of exhaust gas. Therefore, as the volume of the region T2 is increased, the amount of the catalyst applied to a region that contributes to purification of exhaust gas is decreased. As a result, the purification performance is deteriorated. When the radius of curvature R1 is set to 2.0 (mm) or less, excess increase in volume of the region T2 can be suppressed. Therefore, the unnecessary amount of the catalyst can be decreased, and the purification performance can be enhanced. When the conditional expression (1)' is satisfied, the aforementioned effect can be enhanced.

The second bent part 44 has an R shape at a position where the second top surface 42 and the inclined leg surface 45 are joined. The center of curvature of the second bent part 44 is positioned inside the exhaust gas flow channel 47 formed between the second top surface 42 and the flat foil 3a. When the radius of curvature of the second bent part 42 is represented by R2, the radius of curvature R2 satisfies the following conditional expression (2), and preferably the following conditional expression (2)'. The radiuses of curvature R1 and R2 may be the same or different from each other. The radius of curvature R2 is the radius of curvature of inner edge of the second bent part 44.

$$0.02 \text{ (mm)} \leq R2 \leq 2.0 \text{ (mm)} \tag{2}$$

$$0.1 \text{ (mm)} \leq R2 \leq 1.0 \text{ (mm)} \tag{2}'$$

Figure 5:
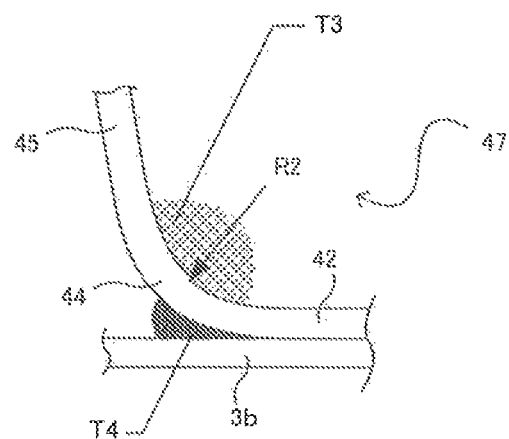
FIG. 5 is an enlarged view of a region A' in FIG. 2 surrounded by a circle with a dotted line.

With reference to FIG. 5, a reason of limitation of the radius of curvature R2 will be described. FIG. 5 is an enlarged view of a region A' in FIG. 2 surrounded by a circle with a dotted line. However, a second protrusion described below is omitted in the figure. When the radius of curvature R2 is set to 0.02 (mm) or more, the generation of turbulent flow that does not contribute to purification performance at a lower corner part in the inside of the exhaust gas flow channel 47 formed between the second top surface 42 and the flat foil 3a, that is, in a region T3 near the second bent part 44 shown by hatching, is suppressed. Therefore, the pressure loss can be decreased without deterioration of purification performance.

When the honeycomb core 1 is immersed in a catalyst bath, the catalyst remains at a lower corner part in the inside of the exhaust gas flow channel 46 formed between the flat foil 3b and the first top surface 41, that is, in a region T4 between the second bent part 44 and the flat foil 3b, shown by hatching. However, the region T4 is a region that does not contribute to purification of exhaust gas. Therefore, as the volume of the region T4 is increased, the amount of the catalyst applied to a region that contributes to purification of exhaust gas is decreased. As a result, the purification performance is deteriorated. When the radius of curvature R2 is set to 2.0 (mm) or less, excess increase in volume of the region T4 can be suppressed. Therefore, the unnecessary amount of the catalyst can be decreased, and the purification performance can be enhanced. When the conditional expression (2)' is satisfied, the aforementioned effect can be enhanced.

When with reference to FIG. 2, the separation distance (hereinafter referred to as cell height) in the layering direction Q between the first top surface 41 and the second top surface 42 is represented by h and the separation distance (hereinafter referred to as cell width) between a pair of inclined leg surfaces 45 connected to the first top surface 41 through the first bent parts 43 is represented by S, the ratio (oblateness) of the cell width S to the cell height h satisfies the following conditional expression (3), and preferably the following conditional expression (3)'.

$$1.5 \leq S/h \leq 10 \tag{3}$$

$$1.8 \leq S/h \leq 4.0 \tag{3}'$$

Specifically, when the cross section of the exhaust gas flow channel 46 formed between the first top surface 41 and the flat foil 3b is formed in a flat shape, turbulent flow is increased as compared with a case where the cross section of the exhaust gas flow channel is square. Therefore, the purification performance can be enhanced. When S/h is less than 1.5, turbulent flow that contributes to enhanced purification performance is decreased, and sufficient purification performance is not achieved. When S/h is more than 10, turbulent flow is excessively generated, and the pressure loss is increased. When the conditional expression (3)' is satisfied, the aforementioned effect can be enhanced. The cross section of the exhaust gas flow channel 47 formed between the second top surface 42 and the flat foil 3a is also formed in a flat shape, and the oblateness thereof satisfies the aforementioned conditional expression (3), and preferably the aforementioned conditional expression (3)'.

The cell width S is preferably 0.5 (mm) or more and 10 (mm) or less. The thickness of the flat foil 3 and the corrugated foil 4 is preferably 5 (μm) or more and 100 (μm) or less.

Figure 6:
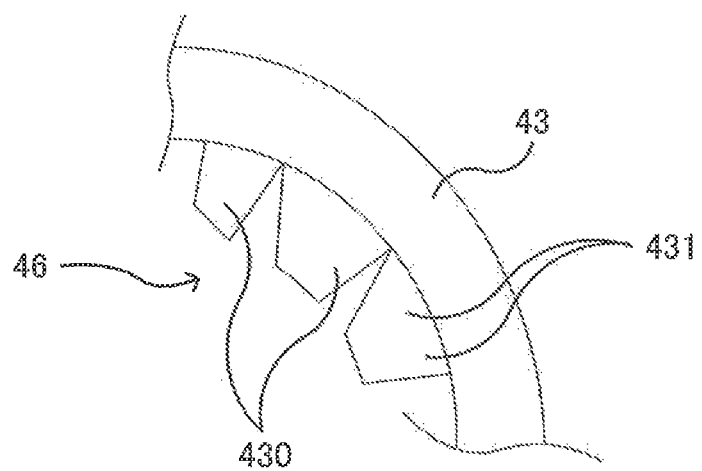
FIG. 6 is a schematically enlarged view of a first bent part and a first protrusion as viewed in the axial direction of the honeycomb core.
Figure 7:
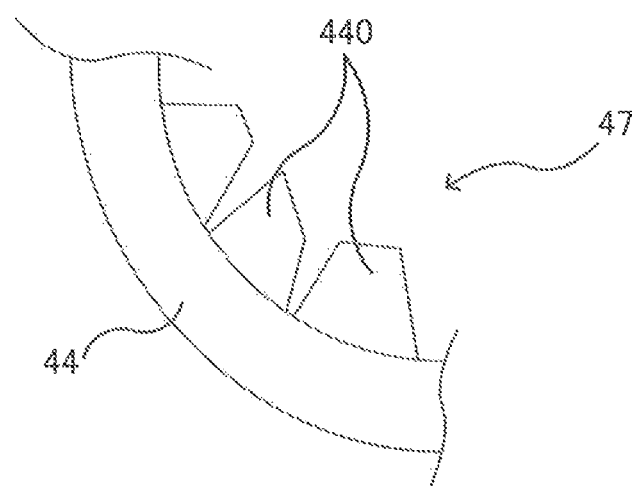
FIG. 7 is a schematically enlarged view of a second bent part and a second protrusion as viewed in the axial direction of the honeycomb core.

With reference to FIGS. 6 and 7, a first protrusion and a second protrusion formed in the first bent part 43 and the second bent part 44, respectively, will be described. FIG. 6 is a schematically enlarged view of the first bent part and the first protrusion as viewed in the axial direction of the honeycomb core. FIG. 7 is a schematically enlarged view of the second bent part and the second protrusion as viewed in the axial direction of the honeycomb core. A plurality of first protrusions 430 are formed on both ends in the axial direction of the first bent part 43, and extend toward the exhaust gas flow channel 46 as viewed in the axial direction. Specifically, the plurality of first protrusions 430 each extend in the foil thickness direction of the first bent part 43, and extend toward a region corresponding to the inside of the exhaust gas flow channel 46. A plurality of second protrusions 440 are formed on both ends in the axial direction of the second bent part 44, and extend toward the exhaust gas flow channel 47 as viewed in the axial direction. Specifically, the plurality of second protrusions 440 each extend in the foil thickness direction of the second bent part 44, and extend toward a region corresponding to the inside of the exhaust gas flow channel 47. Mechanism is not clear. However, when the first protrusions 430 and the second protrusions 440 are formed as shown in Examples described below, an effect of enhancing the purification performance and an effect of decreasing the pressure loss can be further enhanced. The first protrusions 430 and the second protrusions 440 are "burr" formed during molding. Details of a molding method will be described below.

Herein, the protrusion length of the first protrusions 430 is defined as B1, and the protrusion length of the second protrusions 440 is defined as B2. B1 can be calculated by dividing the area of the first protrusions 430 as viewed in the axial direction by the length of the first bent part 43 as viewed in the axial direction. The area of the first protrusions 430 can be determined on the basis of imaging date using a stereo microscope and a scanning electron microscope (SEM). The length of the first bent part 43 is the length of an arc specified by the radius of curvature R1, and can be calculated on the basis of the imaging data described above. B2 can be calculated by dividing the area of the second protrusions 440 as viewed in the axial direction by the length of the second bent part 44 as viewed in the axial direction. The area of the second protrusions 440 can be determined on the basis of imaging date using a stereo microscope and a scanning electron microscope. The length of the second bent part 44 is the length of an arc specified by the radius of curvature R2, and can be calculated on the basis of the imaging data described above.

It is preferable that B1 and B2 satisfy conditional expressions (4) and (5), respectively.

$$2 \text{ (μm)} \leq B1 \leq 45 \text{ (μm)} \tag{4}$$

$$2 \text{ (μm)} \leq B2 \leq 45 \text{ (μm)} \tag{5}$$

When B1 and B2 satisfy the conditional expressions (4) and (5), respectively, the effect of enhancing the purification performance and the effect of decreasing the pressure loss can be further enhanced.

In this embodiment, a plurality of protrusions are formed on each of both ends in the axial direction of each bent part. However, the present invention is not limited to the embodiment, and one protrusion may be formed on each of both ends in the axial direction of each bent part. Even in this case, B1 and B2 can be calculated by the aforementioned calculations.

Herein, the inclination angle of the inclined leg surface 45, that is, the inclination angle α of the inclined leg surface 45 with respect to the layering direction Q preferably satisfies the following conditional expression (6), and more preferably satisfies the following conditional expression (6)'.

$$0.5° \leq \alpha \leq 15° \quad (6)$$

$$2° \leq \alpha \leq 10° \quad (6)'$$

When the inclination angle α is less than 0.5°, an effect to be obtained by satisfying the conditional expressions (1) to (3), that is, an effect of suppressing vortex flow that is generated near the first bent part 43 and the second bent part 44 and does not contribute to enhanced purification performance is deteriorated. When the inclination angle α is more than 15°, an unnecessary amount of the catalyst that does not contribute to purification remains at the region T2 near the first bent part 43 (see FIG. 4) and the region T4 near the second bent part 44 (see FIG. 5), and the purification performance is deteriorated.

With reference to FIG. 3, the length L in the axial direction P of the concavo-convex shaped part 40 (hereinafter referred to as a phase shift length L) satisfies preferably the following conditional expression (7), and more preferably the following conditional expression (7)'.

$$0.5 \text{ (mm)} \leq L \leq 20 \text{ (mm)} \quad (7)$$

$$1.0 \text{ (mm)} \leq L \leq 10 \text{ (mm)} \quad (7)'$$

When the corrugated foil 4 has the offset structure as described above, this causes the turbulent flow to be generated, and thus, the purification performance can be enhanced. However, this effect depends on the phase shift length L. As the phase shift length L is shortened, the turbulent flow is increased. When the phase shift length L is more than 20 (mm), the generation of turbulent flow is insufficient, and the purification performance for exhaust gas is deteriorated. In contrast, when the phase shift length L is less than 0.5 (mm), the effect of enhancing the purification performance is saturated, and the pressure loss is increased.

Figure 8:
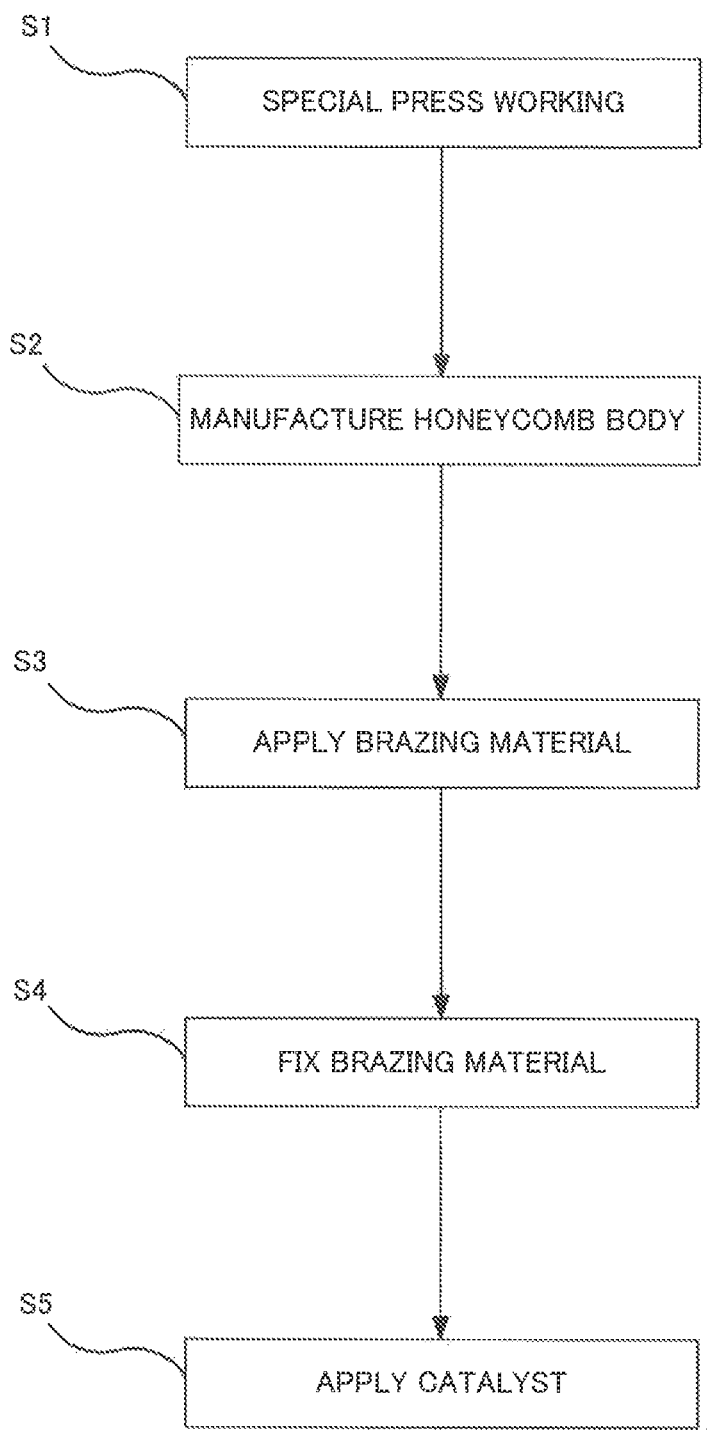
FIG. 8 is a flowchart illustrating a method for manufacturing a catalytic converter.

Next, a method for manufacturing the catalytic converter in this embodiment will be described with reference to FIG. 8. FIG. 8 is a flow chart illustrating the method for manufacturing the catalytic converter. In Step S1, a stainless foil is subjected to special press working, to form the corrugated foil 4. In the special press working, a multi-stage die can be used. By using the multi-stage die, the radiuses of curvature R1 and R2 of the first bent part 43 and the second bent part 44 of the concavo-convex shaped part 40 can be controlled within ranges within which the radiuses of curvature R1 and R2 satisfy the conditional expressions (1) and (2), respectively. Specifically, the special press working is divided into a pre-working step of forming a trapezoidal fin F and an R adjustment step of plastically deforming a bent part of the fin F into an R shape, and the steps are performed. Thus, the corrugated foil 4 can be manufactured.

The pre-working step includes a cutting step and a pushing step. In the cutting step, the stainless foil is cut at a planned position of offset. In the pushing step, the stainless foil is pushed by a die having a rectangular shaped part. By the cutting step and the pushing step, the trapezoidal fin F can be molded and the corrugated foil having the offset structure can be manufactured. When the corrugated foil having the offset structure is manufactured, a time interval between the cutting step and the pushing step of a few tens msec or more is conventionally secured. Therefore, the protrusion length of protrusion (burr) formed at a cut end part is reduced to very short length. In this embodiment, on the other hand, the time interval between the cutting step and the pushing step is controlled to 10 msec or less. Thus, a large tensile force is applied to the cut end part, and the protrusion length of the protrusion can be made longer than that of the conventional protrusion. Specifically, the protrusion length of the protrusion can be adjusted to 2 (μm) or more and 45 (μm) or less by controlling the time interval between the cutting step and the pushing step.

In this embodiment, the special working of increasing the length of burr as compared with the conventional protrusion is performed. Thus, the burr is actively formed. Due to this burr, the effect of enhancing the purification performance and the effect of decreasing the pressure loss are enhanced.

In the R adjustment step, the corner of the fin F is made round by using a die having an R-shaped part corresponding to the radiuses of curvature R1 and R2, to manufacture the corrugated foil 4 that satisfies the conditional expressions (1) and (2). In the R adjustment step, a plurality of dies may be used. In this case, the special press working is performed using a plurality of dies having different R shapes in a stepwise manner in the R adjustment step. Thus, the radiuses of curvature R1 and R2 can be gradually brought close to a target value.

In Step S2, the manufactured corrugated foil 4 and the flat foil 3 are laminated, and wound around a predetermined axial direction. Thus, the honeycomb core 1 is manufactured. At that time, a brazing material is applied to parts to be joined of the first top surface 41 and the flat foil 3a and parts to be joined of the second top surface 42 and the flat foil 3b. In Step S3, the honeycomb core 1 is inserted into the outer jacket 2 made of metal, and a brazing material is applied to parts to be joined of the honeycomb core 1 and the outer jacket 2.

In Step S4, the honeycomb core 1 and the outer jacket 2 in which the brazing material has been applied to the parts to be joined are heated in a vacuum atmosphere. Thus, the brazing material at the parts to be joined is fixed, and the honeycomb core 1 and the outer jacket 2 are joined to each other. At the same time, the corrugated foil 3 and the flat foil 4 constituting the honeycomb core are joined to each other. In Step S5, a wash coat liquid (a solution containing γ alumina, an additive, and a precious metal catalyst as components) is supplied to the exhaust gas flow channel of the honeycomb core 1, and baked by a high-temperature heat treatment. Thus, the catalyst is carried on the honeycomb core 1, and the catalytic converter 100 is manufactured.

According to the method described above, when the corrugated foil is manufactured, rupture of the foil can be prevented. Specifically, when a corrugated foil satisfying the conditional expressions (1) and (2) is manufactured using a one-step die, the foil may be ruptured in the press working. In this embodiment, the press working is divided into the pre-working step and the R adjustment step and the steps are performed. Thus, the corrugated foil satisfying the conditional expressions (1) and (2) can be manufactured without rupture of the foil during working. However, the corrugated foil of the embodiment may be manufactured by bringing a gear into contact with the flat foil. In this case, the press working is also divided into the pre-working step and the R adjustment step. Thus, the corrugated foil satisfying the conditional expressions (1) and (2) can be manufactured.

Next, the present invention will be described in detail by illustrating Examples. A plurality of catalytic converters having different specifications were produced, and the purification performance and the pressure loss were evaluated. The corrugated foil 4 was manufactured by the special press working described above. The flat foil 3 and the corrugated foil 4 were laminated and wound around an axis, to manufacture the honeycomb core 1. A wash coat liquid was allowed to pass through the honeycomb core 1. As the wash coat liquid, a solution containing ceria-zirconia-alumina as a main component was used. From the honeycomb core 1, excessive wash coat liquid was removed. The honeycomb core 1 was dried at a heating temperature of 180° C. for 1 hour, and subsequently baked at a heating temperature of 500° C. for 2 hours. The amount of the wash coat layer formed on the honeycomb core 1 was 180 (g/L) per volume. The radiuses of curvature R1 and R2 were set so as to be the same. The protrusion lengths B1 and B2 of protrusions were set to the same value.

The honeycomb core 1 having the wash coat layer was immersed in distilled water to sufficiently absorb water. The honeycomb core 1 was then pulled up, and excess water content was blown off. The honeycomb core 1 was then immersed in an aqueous solution containing palladium. Subsequently, the honeycomb core 1 was pulled up from this aqueous solution, and dried. The amount of palladium carried on the honeycomb core 1 was 4 (g/L) per volume.

The honeycomb core 1 carrying the catalyst was accommodated into the tube-shaped outer metal cylinder 2 and fixed, to obtain the catalytic converter 100.

Various types of catalytic converters obtained by the aforementioned steps each were loaded in a catalyst container. The purification performance and the pressure loss were evaluated by methods shown below. At that time, each of the catalytic converters was exposed to an atmosphere where air containing 10% by mass of water vapor was heated to 980° C. in advance, and held in this atmosphere for 4 hours. Thus, a simulated deterioration treatment was performed.

(Purification Performance Test)

As a model exhaust gas for evaluation of purification performance, a mixed gas containing CO, HC, and NOx was used. A condition of the gas component was a stoichiometric component. The flow rate SV of the model exhaust gas was set to 100,000 $h^{-1}$. While the model exhaust gas was allowed to flow through the catalytic converter, the model exhaust gas was heated by a heater before an exhaust gas inlet side. The variation of the purification ratio during a temperature increasing process was measured. Gas compositions on the inlet side and the outlet side of the catalytic converter were analyzed, and a decrease ratio thereof was obtained as the purification ratio. The temperature T50 of gas on the inlet side at which the purification ratio reached 50% during the temperature increasing process was used as an evaluation value, and the purification performance was evaluated. T50 of an HC component was used as an evaluation value.

$N_2$ gas of room temperature was allowed to flow through each of the various types of catalytic converters, and the pressure loss generated in the catalytic converter at this time was measured by a digital differential pressure gauge. The values of the pressure loss were evaluated. In the measurement of pressure loss, a honeycomb core had a diameter $\varphi$ of 39 (mm) and a length of 40 (mm), and the flow rate SV of gas was set to 120,000 $h^{-1}$. Tables 1 to 4 show experimental results of Examples. In Tables 1 and 2, the oblateness S/h and the radiuses of curvature R1 and R2 were varied, and other parameters were fixed. A honeycomb core used in measurement of purification performance had a diameter $\varphi$ of 50 (mm) and a length of 45 (mm). A foil contained 20% by mass of Cr, 5.0% by mass of Al, 0.08% by mass of Ti, and 0.08% by mass of misch metal (REM) as components with the balance being Fe, and had a thickness of 80 µm.

TABLE 1

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C | PRESSURE LOSS Pa | EVALUATION | REMARK |
| 1 | 156 | 2.00 | 2.00 | 1.0 | 0 | 0 | 5 | 4 | 318 | 25 | X | COMPARATIVE EXAMPLE |
| 2 | 156 | 1.63 | 2.45 | 1.5 | 0 | 0 | 5 | 4 | 304 | 30 | X | COMPARATIVE EXAMPLE |
| 3 | 156 | 1.49 | 2.68 | 1.8 | 0 | 0 | 5 | 4 | 300 | 35 | X | COMPARATIVE EXAMPLE |
| 4 | 156 | 1.26 | 3.16 | 2.5 | 0 | 0 | 5 | 4 | 296 | 45 | X | COMPARATIVE EXAMPLE |
| 5 | 156 | 1.00 | 4.00 | 4.0 | 0 | 0 | 5 | 4 | 292 | 60 | X | COMPARATIVE EXAMPLE |
| 6 | 156 | 0.63 | 6.32 | 10.0 | 0 | 0 | 5 | 4 | 287 | 105 | X | COMPARATIVE EXAMPLE |
| 7 | 156 | 0.58 | 6.93 | 12.0 | 0 | 0 | 5 | 4 | 286 | 160 | X | COMPARATIVE EXAMPLE |
| 8 | 156 | 2.00 | 2.00 | 1.0 | 0.02 | 0 | 5 | 4 | 317 | 23 | ○ | INVENTIVE EXAMPLE |
| 9 | 156 | 1.63 | 2.45 | 1.5 | 0.02 | 0 | 5 | 4 | 304 | 25 | ○ | INVENTIVE EXAMPLE |
| 10 | 156 | 1.49 | 2.68 | 1.8 | 0.02 | 0 | 5 | 4 | 300 | 28 | ○ | INVENTIVE EXAMPLE |
| 11 | 156 | 1.26 | 3.16 | 2.5 | 0.02 | 0 | 5 | 4 | 296 | 32 | ○ | INVENTIVE EXAMPLE |
| 12 | 156 | 1.00 | 4.00 | 4.0 | 0.02 | 0 | 5 | 4 | 292 | 35 | ○ | INVENTIVE EXAMPLE |
| 13 | 156 | 0.63 | 6.32 | 10.0 | 0.02 | 0 | 5 | 4 | 286 | 76 | ○ | INVENTIVE EXAMPLE |
| 14 | 156 | 1.63 | 2.45 | 1.5 | 0.02 | 5 | 5 | 4 | 298 | 22 | ◎ | INVENTIVE EXAMPLE |
| 15 | 156 | 1.49 | 2.68 | 1.8 | 0.02 | 5 | 5 | 4 | 296 | 24 | ◎ | INVENTIVE EXAMPLE |
| 16 | 156 | 1.26 | 3.16 | 2.5 | 0.02 | 5 | 5 | 4 | 291 | 26 | ◎ | INVENTIVE EXAMPLE |
| 17 | 156 | 1.00 | 4.00 | 4.0 | 0.02 | 5 | 5 | 4 | 289 | 30 | ◎ | INVENTIVE EXAMPLE |
| 18 | 156 | 0.63 | 6.32 | 10.0 | 0.02 | 5 | 5 | 4 | 281 | 76 | ◎ | INVENTIVE EXAMPLE |
| 19 | 156 | 0.58 | 6.93 | 12.0 | 0.02 | 0 | 5 | 4 | 285 | 140 | X | COMPARATIVE EXAMPLE |
| 20 | 156 | 2.00 | 2.00 | 1.0 | 0.05 | 0 | 5 | 4 | 316 | 23 | X | COMPARATIVE EXAMPLE |
| 21 | 156 | 1.63 | 2.45 | 1.5 | 0.05 | 0 | 5 | 4 | 303 | 25 | ○ | INVENTIVE EXAMPLE |
| 22 | 156 | 1.49 | 2.68 | 1.8 | 0.05 | 0 | 5 | 4 | 299 | 26 | ○ | INVENTIVE EXAMPLE |

TABLE 1-continued

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 µm | ANGLE α degree | PHASE SHIFT L mm | T50 °C. | PRESSURE LOSS Pa | EVALUATION | REMARK |
| 23 | 156 | 1.26 | 3.16 | 2.5 | 0.05 | 0 | 5 | 4 | 295 | 28 | ○ | INVENTIVE EXAMPLE |
| 24 | 156 | 1.00 | 4.00 | 4.0 | 0.05 | 0 | 5 | 4 | 291 | 31 | ○ | INVENTIVE EXAMPLE |
| 25 | 156 | 0.63 | 6.32 | 10.0 | 0.05 | 0 | 5 | 4 | 285 | 68 | ○ | INVENTIVE EXAMPLE |
| 26 | 156 | 1.63 | 2.45 | 1.5 | 0.05 | 10 | 5 | 4 | 298 | 22 | ◎ | INVENTIVE EXAMPLE |
| 27 | 156 | 1.49 | 2.68 | 1.8 | 0.05 | 10 | 5 | 4 | 295 | 23 | ◎ | INVENTIVE EXAMPLE |
| 28 | 156 | 1.26 | 3.16 | 2.5 | 0.05 | 10 | 5 | 4 | 292 | 24 | ◎ | INVENTIVE EXAMPLE |
| 29 | 156 | 1.00 | 4.00 | 4.0 | 0.05 | 10 | 5 | 4 | 288 | 28 | ◎ | INVENTIVE EXAMPLE |
| 30 | 156 | 0.63 | 6.32 | 10.0 | 0.05 | 10 | 5 | 4 | 282 | 68 | ◎ | INVENTIVE EXAMPLE |
| 31 | 156 | 0.58 | 6.93 | 12.0 | 0.05 | 10 | 5 | 4 | 284 | 135 | X | COMPARATIVE EXAMPLE |
| 32 | 156 | 2.00 | 2.00 | 1.0 | 0.1 | 0 | 5 | 4 | 315 | 23 | X | COMPARATIVE EXAMPLE |
| 33 | 156 | 1.63 | 2.45 | 1.5 | 0.1 | 0 | 5 | 4 | 303 | 23 | ○ | INVENTIVE EXAMPLE |
| 34 | 156 | 1.49 | 2.68 | 1.8 | 0.1 | 0 | 5 | 4 | 299 | 24 | ○ | INVENTIVE EXAMPLE |
| 35 | 156 | 1.26 | 3.16 | 2.5 | 0.1 | 0 | 5 | 4 | 295 | 26 | ○ | INVENTIVE EXAMPLE |
| 36 | 156 | 1.00 | 4.00 | 4.0 | 0.1 | 0 | 5 | 4 | 291 | 28 | ○ | INVENTIVE EXAMPLE |
| 37 | 156 | 0.63 | 6.32 | 10.0 | 0.1 | 0 | 5 | 4 | 285 | 60 | ○ | INVENTIVE EXAMPLE |
| 38 | 156 | 1.63 | 2.45 | 1.5 | 0.1 | 20 | 5 | 4 | 298 | 23 | ◎ | INVENTIVE EXAMPLE |
| 39 | 156 | 1.49 | 2.68 | 1.8 | 0.1 | 20 | 5 | 4 | 295 | 24 | ◎ | INVENTIVE EXAMPLE |
| 40 | 156 | 1.26 | 3.16 | 2.5 | 0.1 | 20 | 5 | 4 | 290 | 26 | ◎ | INVENTIVE EXAMPLE |
| 41 | 156 | 1.00 | 4.00 | 4.0 | 0.1 | 20 | 5 | 4 | 288 | 28 | ◎ | INVENTIVE EXAMPLE |
| 42 | 156 | 0.63 | 6.32 | 10.0 | 0.1 | 20 | 5 | 4 | 282 | 60 | ◎ | INVENTIVE EXAMPLE |
| 43 | 156 | 0.58 | 6.93 | 12.0 | 0.1 | 0 | 5 | 4 | 284 | 130 | X | COMPARATIVE EXAMPLE |

TABLE 2

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 44 | 156 | 2.00 | 2.00 | 1.0 | 0.5 | 0 | 5 | 4 | 314 | 24 | X | COMPARATIVE EXAMPLE |
| 45 | 156 | 1.63 | 2.45 | 1.5 | 0.5 | 0 | 5 | 4 | 303 | 23 | ○ | INVENTIVE EXAMPLE |
| 46 | 156 | 1.49 | 2.68 | 1.8 | 0.5 | 0 | 5 | 4 | 299 | 24 | ○ | INVENTIVE EXAMPLE |
| 47 | 156 | 1.26 | 3.16 | 2.5 | 0.5 | 0 | 5 | 4 | 295 | 26 | ○ | INVENTIVE EXAMPLE |
| 48 | 156 | 1.00 | 4.00 | 4.0 | 0.5 | 0 | 5 | 4 | 291 | 28 | ○ | INVENTIVE EXAMPLE |
| 49 | 156 | 0.63 | 6.32 | 10.0 | 0.5 | 0 | 5 | 4 | 285 | 60 | ○ | INVENTIVE EXAMPLE |
| 50 | 156 | 1.63 | 2.45 | 1.5 | 0.5 | 30 | 5 | 4 | 298 | 23 | ◎ | INVENTIVE EXAMPLE |
| 51 | 156 | 1.49 | 2.68 | 1.8 | 0.5 | 30 | 5 | 4 | 294 | 24 | ◎ | INVENTIVE EXAMPLE |
| 52 | 156 | 1.26 | 3.16 | 2.5 | 0.5 | 30 | 5 | 4 | 292 | 26 | ◎ | INVENTIVE EXAMPLE |
| 53 | 156 | 1.00 | 4.00 | 4.0 | 0.5 | 30 | 5 | 4 | 288 | 28 | ◎ | INVENTIVE EXAMPLE |
| 54 | 156 | 0.63 | 6.32 | 10.0 | 0.5 | 30 | 5 | 4 | 282 | 60 | ◎ | INVENTIVE EXAMPLE |
| 55 | 156 | 0.58 | 6.93 | 12.0 | 0.5 | 0 | 5 | 4 | 284 | 120 | X | COMPARATIVE EXAMPLE |
| 56 | 156 | 2.00 | 2.00 | 1.0 | 1.0 | 0 | 5 | 4 | 315 | 23 | X | COMPARATIVE EXAMPLE |
| 57 | 156 | 1.63 | 2.45 | 1.5 | 1.0 | 0 | 5 | 4 | 303 | 23 | ○ | INVENTIVE EXAMPLE |
| 58 | 156 | 1.49 | 2.68 | 1.8 | 1.0 | 0 | 5 | 4 | 299 | 24 | ○ | INVENTIVE EXAMPLE |
| 59 | 156 | 1.26 | 3.16 | 2.5 | 1.0 | 0 | 5 | 4 | 296 | 25 | ○ | INVENTIVE EXAMPLE |
| 60 | 156 | 1.00 | 4.00 | 4.0 | 1.0 | 0 | 5 | 4 | 293 | 26 | ○ | INVENTIVE EXAMPLE |
| 61 | 156 | 0.63 | 6.32 | 10.0 | 1.0 | 0 | 5 | 4 | 285 | 59 | ○ | INVENTIVE EXAMPLE |
| 62 | 156 | 1.63 | 2.45 | 1.5 | 1.0 | 40 | 5 | 4 | 297 | 22 | ◎ | INVENTIVE EXAMPLE |
| 63 | 156 | 1.49 | 2.68 | 1.8 | 1.0 | 40 | 5 | 4 | 294 | 22 | ◎ | INVENTIVE EXAMPLE |
| 64 | 156 | 1.26 | 3.16 | 2.5 | 1.0 | 40 | 5 | 4 | 293 | 23 | ◎ | INVENTIVE EXAMPLE |
| 65 | 156 | 1.00 | 4.00 | 4.0 | 1.0 | 40 | 5 | 4 | 288 | 26 | ◎ | INVENTIVE EXAMPLE |

TABLE 2-continued

| | HONEYCOMB SPECIFICATION | | | | | | | | | EVALUATION VALUE | | | |
|---|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 66 | 156 | 0.63 | 6.32 | 10.0 | 1.0 | 40 | 5 | 4 | 282 | 59 | ⊚ | INVENTIVE EXAMPLE |
| 67 | 156 | 0.58 | 6.93 | 12.0 | 1.0 | 0 | 5 | 4 | 284 | 110 | X | COMPARATIVE EXAMPLE |
| 68 | 156 | 2.00 | 2.00 | 1.0 | 2.0 | 0 | 5 | 4 | 316 | 23 | X | COMPARATIVE EXAMPLE |
| 69 | 156 | 1.63 | 2.45 | 1.5 | 2.0 | 0 | 5 | 4 | 306 | 23 | ○ | INVENTIVE EXAMPLE |
| 70 | 156 | 1.49 | 2.68 | 1.8 | 2.0 | 0 | 5 | 4 | 302 | 24 | ○ | INVENTIVE EXAMPLE |
| 71 | 156 | 1.26 | 3.16 | 2.5 | 2.0 | 0 | 5 | 4 | 298 | 25 | ○ | INVENTIVE EXAMPLE |
| 72 | 156 | 1.00 | 4.00 | 4.0 | 2.0 | 0 | 5 | 4 | 294 | 26 | ○ | INVENTIVE EXAMPLE |
| 73 | 156 | 0.63 | 6.32 | 10.0 | 2.0 | 0 | 5 | 4 | 288 | 59 | ○ | INVENTIVE EXAMPLE |
| 74 | 156 | 1.63 | 2.45 | 1.5 | 2.0 | 45 | 5 | 4 | 297 | 21 | ⊚ | INVENTIVE EXAMPLE |
| 75 | 156 | 1.49 | 2.68 | 1.8 | 2.0 | 45 | 5 | 4 | 295 | 22 | ⊚ | INVENTIVE EXAMPLE |
| 76 | 156 | 1.26 | 3.16 | 2.5 | 2.0 | 45 | 5 | 4 | 292 | 23 | ⊚ | INVENTIVE EXAMPLE |
| 77 | 156 | 1.00 | 4.00 | 4.0 | 2.0 | 45 | 5 | 4 | 291 | 25 | ⊚ | INVENTIVE EXAMPLE |
| 78 | 156 | 0.63 | 6.32 | 10.0 | 2.0 | 45 | 5 | 4 | 283 | 59 | ⊚ | INVENTIVE EXAMPLE |
| 79 | 156 | 1.63 | 2.45 | 1.5 | 2.0 | 50 | 5 | 4 | 298 | 31 | ○ | INVENTIVE EXAMPLE |
| 80 | 156 | 1.49 | 2.68 | 1.8 | 2.0 | 50 | 5 | 4 | 296 | 32 | ○ | INVENTIVE EXAMPLE |
| 81 | 156 | 1.26 | 3.16 | 2.5 | 2.0 | 50 | 5 | 4 | 293 | 33 | ○ | INVENTIVE EXAMPLE |
| 82 | 156 | 1.00 | 4.00 | 4.0 | 2.0 | 50 | 5 | 4 | 292 | 35 | ○ | INVENTIVE EXAMPLE |
| 83 | 156 | 0.63 | 6.32 | 10.0 | 2.0 | 50 | 5 | 4 | 283 | 69 | ○ | INVENTIVE EXAMPLE |
| 84 | 156 | 0.58 | 6.93 | 12.0 | 2.0 | 0 | 5 | 4 | 287 | 110 | X | COMPARATIVE EXAMPLE |
| 85 | 156 | 2.00 | 2.00 | 1.0 | 2.2 | 0 | 5 | 4 | 318 | 24 | X | COMPARATIVE EXAMPLE |
| 86 | 156 | 1.63 | 2.45 | 1.5 | 2.2 | 0 | 5 | 4 | 312 | 25 | X | COMPARATIVE EXAMPLE |
| 87 | 156 | 1.49 | 2.68 | 1.8 | 2.2 | 0 | 5 | 4 | 310 | 26 | X | COMPARATIVE EXAMPLE |
| 88 | 156 | 1.26 | 3.16 | 2.5 | 2.2 | 0 | 5 | 4 | 307 | 28 | X | COMPARATIVE EXAMPLE |

TABLE 2-continued

| | HONEYCOMB SPECIFICATION | | | | | | | | | EVALUATION VALUE | | | |
|---|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | | T50 °C. | PRESSURE LOSS Pa | EVALUATION | REMARK |
| 89 | 156 | 1.00 | 4.00 | 4.0 | 2.2 | 0 | 5 | 4 | | 303 | 32 | X | COMPARATIVE EXAMPLE |
| 90 | 156 | 0.63 | 6.32 | 10.0 | 2.2 | 0 | 5 | 4 | | 295 | 59 | X | COMPARATIVE EXAMPLE |
| 91 | 156 | 0.58 | 6.93 | 12.0 | 2.2 | 0 | 5 | 4 | | 292 | 92 | X | COMPARATIVE EXAMPLE |

Figure 9:
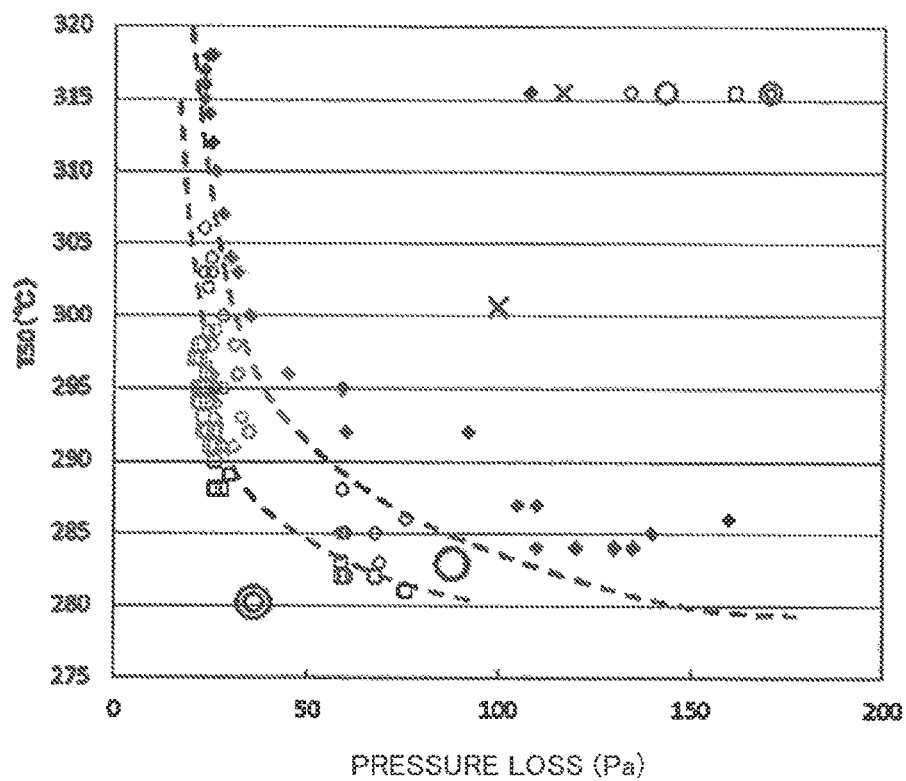
FIG. 9 is a graph on which each of Inventive Examples and each of Comparative Examples in Tables 1 and 2 are plotted.

FIG. 9 is a graph on which each of Inventive Examples and each of Comparative Examples in Tables 1 and 2 are plotted. A horizontal axis shows the pressure loss (Pa), and a vertical axis shows T50 (° C.). Two dashed lines are threshold value curves for judging the pressure loss (Pa) and T50 (° C.) (i.e., purification performance) to be good or poor. When data were plotted at a region represented by a double circle on a left side of the two threshold value curves, the comprehensive evaluation of pressure loss and purification performance was judged to be "excellent" (double circle). When data were plotted at a region represented by a circle between the two threshold value curves, the comprehensive evaluation of pressure loss and purification performance was judged to be "good" (circle). When data were plotted at a region represented by a cross on a right side of the two threshold value curves, the comprehensive evaluation of pressure loss and purification performance was judged to be "poor" (cross). The threshold value curves were determined from experiments.

In Tables 3 and 4, the cell density, the oblateness S/h, the radiuses of curvature R1 and R2, and the phase shift L were varied, and other parameters were fixed. A honeycomb core used in measurement of purification performance had a diameter φ of 120 (mm) and a length of 90 (mm). A foil contained 20% by mass of Cr, 5.8% by mass of Al, 0.1% by mass of Zr, and 0.08% by mass of La as components with the balance being Fe, and had a thickness of 30 μm.

TABLE 3

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 92 | 69 | 3.00 | 3.00 | 1.0 | 0 | 0 | 5 | 6 | 378 | 16 | X | COMPARATIVE EXAMPLE |
| 93 | 100 | 2.50 | 2.50 | 1.0 | 0 | 0 | 5 | 5 | 335 | 24 | X | COMPARATIVE EXAMPLE |
| 94 | 156 | 2.00 | 2.00 | 1.0 | 0 | 0 | 5 | 4 | 315 | 36 | X | COMPARATIVE EXAMPLE |
| 95 | 278 | 1.50 | 1.50 | 1.0 | 0 | 0 | 5 | 3 | 303 | 52 | X | COMPARATIVE EXAMPLE |
| 96 | 400 | 1.25 | 1.25 | 1.0 | 0 | 0 | 5 | 2.5 | 296.9 | 67 | X | COMPARATIVE EXAMPLE |
| 97 | 625 | 1.00 | 1.00 | 1.0 | 0 | 0 | 5 | 2 | 292 | 101.3 | X | COMPARATIVE EXAMPLE |
| 98 | 1111 | 0.75 | 0.75 | 1.0 | 0 | 0 | 5 | 1.5 | 286 | 165 | X | COMPARATIVE EXAMPLE |
| 99 | 69 | 2.45 | 3.67 | 1.5 | 0.02 | 0 | 5 | 6 | 360 | 8.4 | ○ | INVENTIVE EXAMPLE |
| 100 | 100 | 2.04 | 3.06 | 1.5 | 0.02 | 0 | 5 | 5 | 321 | 10.5 | ○ | INVENTIVE EXAMPLE |
| 101 | 156 | 1.63 | 2.45 | 1.5 | 0.02 | 0 | 5 | 4 | 308 | 22.9 | ○ | INVENTIVE EXAMPLE |
| 102 | 278 | 1.22 | 1.84 | 1.5 | 0.02 | 0 | 5 | 3 | 297 | 40.6 | ○ | INVENTIVE EXAMPLE |
| 103 | 400 | 1.02 | 1.53 | 1.5 | 0.02 | 0 | 5 | 2.5 | 293 | 57.4 | ○ | INVENTIVE EXAMPLE |
| 104 | 625 | 0.82 | 1.22 | 1.5 | 0.02 | 0 | 5 | 2 | 290 | 91.4 | ○ | INVENTIVE EXAMPLE |
| 105 | 1111 | 0.61 | 0.92 | 1.5 | 0.02 | 0 | 5 | 1.5 | 283 | 140 | ○ | INVENTIVE EXAMPLE |
| 106 | 69 | 2.45 | 3.67 | 1.5 | 0.02 | 42 | 5 | 6 | 354 | 8 | ◎ | INVENTIVE EXAMPLE |
| 107 | 100 | 2.04 | 3.06 | 1.5 | 0.02 | 30 | 5 | 5 | 314 | 10.1 | ◎ | INVENTIVE EXAMPLE |
| 108 | 156 | 1.63 | 2.45 | 1.5 | 0.02 | 21 | 5 | 4 | 297 | 21.9 | ◎ | INVENTIVE EXAMPLE |
| 109 | 278 | 1.22 | 1.84 | 1.5 | 0.02 | 14 | 5 | 3 | 292 | 39.1 | ◎ | INVENTIVE EXAMPLE |
| 110 | 400 | 1.02 | 1.53 | 1.5 | 0.02 | 8 | 5 | 2.5 | 288 | 56.2 | ◎ | INVENTIVE EXAMPLE |
| 111 | 625 | 0.82 | 1.22 | 1.5 | 0.02 | 5 | 5 | 2 | 284 | 87.3 | ◎ | INVENTIVE EXAMPLE |
| 112 | 1111 | 0.61 | 0.92 | 1.5 | 0.02 | 3 | 5 | 1.5 | 278 | 137 | ◎ | INVENTIVE EXAMPLE |
| 113 | 69 | 2.30 | 3.91 | 1.7 | 0.05 | 0 | 5 | 6 | 350 | 8.4 | ○ | INVENTIVE EXAMPLE |

TABLE 3-continued

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 114 | 100 | 1.92 | 3.26 | 1.7 | 0.05 | 0 | 5 | 5 | 315 | 10.4 | ○ | INVENTIVE EXAMPLE |
| 115 | 156 | 1.53 | 2.61 | 1.7 | 0.05 | 0 | 5 | 4 | 302 | 22.7 | ○ | INVENTIVE EXAMPLE |
| 116 | 278 | 1.15 | 1.96 | 1.7 | 0.05 | 0 | 5 | 3 | 295 | 40.1 | ○ | INVENTIVE EXAMPLE |
| 117 | 400 | 0.96 | 1.63 | 1.7 | 0.05 | 0 | 5 | 2.5 | 292 | 56.8 | ○ | INVENTIVE EXAMPLE |
| 118 | 625 | 0.77 | 1.30 | 1.7 | 0.05 | 0 | 5 | 2 | 288 | 90.8 | ○ | INVENTIVE EXAMPLE |
| 119 | 1111 | 0.58 | 0.98 | 1.7 | 0.05 | 0 | 5 | 1.5 | 282 | 138 | ○ | INVENTIVE EXAMPLE |
| 120 | 69 | 2.30 | 3.91 | 1.7 | 0.05 | 42 | 5 | 6 | 341 | 7.9 | ◎ | INVENTIVE EXAMPLE |
| 121 | 100 | 1.92 | 3.26 | 1.7 | 0.05 | 30 | 5 | 5 | 306 | 9.8 | ◎ | INVENTIVE EXAMPLE |
| 122 | 156 | 1.53 | 2.61 | 1.7 | 0.05 | 21 | 5 | 4 | 294 | 21.2 | ◎ | INVENTIVE EXAMPLE |
| 123 | 278 | 1.15 | 1.96 | 1.7 | 0.05 | 14 | 5 | 3 | 288 | 39.8 | ◎ | INVENTIVE EXAMPLE |
| 124 | 400 | 0.96 | 1.63 | 1.7 | 0.05 | 8 | 5 | 2.5 | 287 | 54.8 | ◎ | INVENTIVE EXAMPLE |
| 125 | 625 | 0.77 | 1.30 | 1.7 | 0.05 | 5 | 5 | 2 | 283 | 88.6 | ◎ | INVENTIVE EXAMPLE |
| 126 | 1111 | 0.58 | 0.98 | 1.7 | 0.05 | 3 | 5 | 1.5 | 276 | 130 | ◎ | INVENTIVE EXAMPLE |
| 127 | 69 | 2.12 | 4.24 | 2.0 | 0.10 | 0 | 5 | 6 | 342 | 8.6 | ○ | INVENTIVE EXAMPLE |
| 128 | 100 | 1.77 | 3.54 | 2.0 | 0.10 | 0 | 5 | 5 | 308 | 10.5 | ○ | INVENTIVE EXAMPLE |
| 129 | 156 | 1.41 | 2.83 | 2.0 | 0.10 | 0 | 5 | 4 | 298 | 23 | ○ | INVENTIVE EXAMPLE |
| 130 | 278 | 1.06 | 2.12 | 2.0 | 0.10 | 0 | 5 | 3 | 293 | 40.8 | ○ | INVENTIVE EXAMPLE |
| 131 | 400 | 0.88 | 1.77 | 2.0 | 0.10 | 0 | 5 | 2.5 | 289 | 57.6 | ○ | INVENTIVE EXAMPLE |
| 132 | 625 | 0.71 | 1.41 | 2.0 | 0.10 | 0 | 5 | 2 | 282 | 91.6 | ○ | INVENTIVE EXAMPLE |
| 133 | 1111 | 0.53 | 1.06 | 2.0 | 0.10 | 0 | 5 | 1.5 | 280 | 141 | ○ | INVENTIVE EXAMPLE |
| 134 | 69 | 2.12 | 4.24 | 2.0 | 0.10 | 42 | 5 | 6 | 334 | 8.6 | ◎ | INVENTIVE EXAMPLE |
| 135 | 100 | 1.77 | 3.54 | 2.0 | 0.10 | 30 | 5 | 5 | 300 | 10.5 | ◎ | INVENTIVE EXAMPLE |
| 136 | 156 | 1.41 | 2.83 | 2.0 | 0.10 | 21 | 5 | 4 | 294 | 23 | ◎ | INVENTIVE EXAMPLE |

TABLE 3-continued

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 137 | 278 | 1.06 | 2.12 | 2.0 | 0.10 | 14 | 5 | 3 | 289 | 40.8 | ◎ | INVENTIVE EXAMPLE |
| 138 | 400 | 0.88 | 1.77 | 2.0 | 0.10 | 8 | 5 | 2.5 | 282 | 57.6 | ◎ | INVENTIVE EXAMPLE |
| 139 | 625 | 0.71 | 1.41 | 2.0 | 0.10 | 5 | 5 | 2 | 279 | 91.6 | ◎ | INVENTIVE EXAMPLE |
| 140 | 1111 | 0.53 | 1.06 | 2.0 | 0.10 | 3 | 5 | 1.5 | 274 | 141 | ◎ | INVENTIVE EXAMPLE |

TABLE 4

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C | PRESSURE LOSS Pa | EVALUATION | REMARK |
| 141 | 69 | 1.90 | 4.74 | 2.5 | 0.40 | 0 | 5 | 6 | 336 | 9.1 | ○ | INVENTIVE EXAMPLE |
| 142 | 100 | 1.58 | 3.95 | 2.5 | 0.40 | 0 | 5 | 5 | 305 | 10.9 | ○ | INVENTIVE EXAMPLE |
| 143 | 156 | 1.26 | 3.16 | 2.5 | 0.40 | 0 | 5 | 4 | 296 | 23.4 | ○ | INVENTIVE EXAMPLE |
| 144 | 278 | 0.95 | 2.37 | 2.5 | 0.40 | 0 | 5 | 3 | 292 | 41.2 | ○ | INVENTIVE EXAMPLE |
| 145 | 400 | 0.79 | 1.98 | 2.5 | 0.40 | 0 | 5 | 2.5 | 286 | 58.1 | ○ | INVENTIVE EXAMPLE |
| 146 | 625 | 0.63 | 1.58 | 2.5 | 0.40 | 0 | 5 | 2 | 283 | 92.1 | ○ | INVENTIVE EXAMPLE |
| 147 | 1111 | 0.47 | 1.19 | 2.5 | 0.40 | 0 | 5 | 1.5 | 281 | 155 | ○ | INVENTIVE EXAMPLE |
| 148 | 69 | 1.90 | 4.74 | 2.5 | 0.40 | 42 | 5 | 6 | 330 | 9.1 | ◎ | INVENTIVE EXAMPLE |
| 149 | 100 | 1.58 | 3.95 | 2.5 | 0.40 | 30 | 5 | 5 | 298 | 10.9 | ◎ | INVENTIVE EXAMPLE |
| 150 | 156 | 1.26 | 3.16 | 2.5 | 0.40 | 21 | 5 | 4 | 292 | 23.4 | ◎ | INVENTIVE EXAMPLE |
| 151 | 278 | 0.95 | 2.37 | 2.5 | 0.40 | 14 | 5 | 3 | 287 | 41.2 | ◎ | INVENTIVE EXAMPLE |
| 152 | 400 | 0.79 | 1.98 | 2.5 | 0.40 | 8 | 5 | 2.5 | 282 | 58.1 | ◎ | INVENTIVE EXAMPLE |
| 153 | 625 | 0.63 | 1.58 | 2.5 | 0.40 | 5 | 5 | 2 | 278 | 92.1 | ◎ | INVENTIVE EXAMPLE |
| 154 | 1111 | 0.47 | 1.19 | 2.5 | 0.40 | 3 | 5 | 1.5 | 275 | 143 | ◎ | INVENTIVE EXAMPLE |
| 155 | 69 | 1.50 | 6.00 | 4.0 | 1.00 | 0 | 5 | 6 | 330 | 12 | ○ | INVENTIVE EXAMPLE |
| 156 | 100 | 1.25 | 5.00 | 4.0 | 1.00 | 0 | 5 | 5 | 303 | 15 | ○ | INVENTIVE EXAMPLE |
| 157 | 156 | 1.00 | 4.00 | 4.0 | 1.00 | 0 | 5 | 4 | 296 | 31 | ○ | INVENTIVE EXAMPLE |
| 158 | 278 | 0.75 | 3.00 | 4.0 | 1.00 | 0 | 5 | 3 | 292 | 54 | ○ | INVENTIVE EXAMPLE |
| 159 | 400 | 0.63 | 2.50 | 4.0 | 1.00 | 0 | 5 | 2.5 | 287 | 64 | ○ | INVENTIVE EXAMPLE |
| 160 | 625 | 0.50 | 2.00 | 4.0 | 1.00 | 0 | 5 | 2 | 283 | 101 | ○ | INVENTIVE EXAMPLE |
| 161 | 1111 | 0.38 | 1.50 | 4.0 | 1.00 | 0 | 5 | 1.5 | 281 | 179 | ○ | INVENTIVE EXAMPLE |
| 162 | 69 | 1.50 | 6.00 | 4.0 | 1.00 | 42 | 5 | 6 | 323 | 9.8 | ◎ | INVENTIVE EXAMPLE |

TABLE 4-continued

| | HONEYCOMB SPECIFICATION | | | | | | | | | EVALUATION VALUE | | | |
|---|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 163 | 100 | 1.25 | 5.00 | 4.0 | 1.00 | 30 | 5 | 5 | 297 | 12.6 | ◎ | INVENTIVE EXAMPLE |
| 164 | 156 | 1.00 | 4.00 | 4.0 | 1.00 | 21 | 5 | 4 | 290 | 27.48 | ◎ | INVENTIVE EXAMPLE |
| 165 | 278 | 0.75 | 3.00 | 4.0 | 1.00 | 14 | 5 | 3 | 286 | 48.72 | ◎ | INVENTIVE EXAMPLE |
| 166 | 400 | 0.63 | 2.50 | 4.0 | 1.00 | 8 | 5 | 2.5 | 281 | 68.88 | ◎ | INVENTIVE EXAMPLE |
| 167 | 625 | 0.50 | 2.00 | 4.0 | 1.00 | 5 | 5 | 2 | 278 | 109.68 | ◎ | INVENTIVE EXAMPLE |
| 168 | 1111 | 0.38 | 1.50 | 4.0 | 1.00 | 3 | 5 | 1.5 | 275 | 168 | ◎ | INVENTIVE EXAMPLE |
| 169 | 69 | 1.00 | 9.00 | 9.0 | 2.00 | 0 | 5 | 6 | 327 | 13.7 | ○ | INVENTIVE EXAMPLE |
| 170 | 100 | 0.83 | 7.50 | 9.0 | 2.00 | 0 | 5 | 5 | 302 | 26.25 | ○ | INVENTIVE EXAMPLE |
| 171 | 156 | 0.67 | 6.00 | 9.0 | 2.00 | 0 | 5 | 4 | 291 | 57.25 | ○ | INVENTIVE EXAMPLE |
| 172 | 278 | 0.50 | 4.50 | 9.0 | 2.00 | 0 | 5 | 3 | 287 | 101.5 | ○ | INVENTIVE EXAMPLE |
| 173 | 400 | 0.42 | 3.75 | 9.0 | 2.00 | 0 | 5 | 2.5 | 285 | 143.5 | ○ | INVENTIVE EXAMPLE |
| 174 | 625 | 0.33 | 3.00 | 9.0 | 2.00 | 0 | 5 | 2 | 281 | 228.5 | ○ | INVENTIVE EXAMPLE |
| 175 | 1111 | 0.25 | 2.25 | 9.0 | 2.00 | 0 | 5 | 1.5 | 277 | 350 | ○ | INVENTIVE EXAMPLE |
| 176 | 69 | 1.00 | 9.00 | 9.0 | 2.00 | 42 | 5 | 6 | 318 | 13.8 | ◎ | INVENTIVE EXAMPLE |
| 177 | 100 | 0.83 | 7.50 | 9.0 | 2.00 | 30 | 5 | 5 | 295 | 26.25 | ◎ | INVENTIVE EXAMPLE |
| 178 | 156 | 0.67 | 6.00 | 9.0 | 2.00 | 21 | 5 | 4 | 284 | 57.25 | ◎ | INVENTIVE EXAMPLE |
| 179 | 278 | 0.50 | 4.50 | 9.0 | 2.00 | 14 | 5 | 3 | 282 | 101.5 | ◎ | INVENTIVE EXAMPLE |
| 180 | 400 | 0.42 | 3.75 | 9.0 | 2.00 | 8 | 5 | 2.5 | 278 | 143.5 | ◎ | INVENTIVE EXAMPLE |
| 181 | 625 | 0.33 | 3.00 | 9.0 | 2.00 | 5 | 5 | 2 | 274 | 228.5 | ◎ | INVENTIVE EXAMPLE |
| 182 | 1111 | 0.25 | 2.25 | 9.0 | 2.00 | 3 | 5 | 1.5 | 271 | 350 | ◎ | INVENTIVE EXAMPLE |
| 183 | 69 | 0.87 | 10.39 | 12.0 | 2.20 | 0 | 5 | 6 | 337 | 42 | X | COMPARATIVE EXAMPLE |
| 184 | 100 | 0.72 | 8.66 | 12.0 | 2.20 | 0 | 5 | 5 | 312 | 65 | X | COMPARATIVE EXAMPLE |
| 185 | 156 | 0.58 | 6.93 | 12.0 | 2.20 | 0 | 5 | 4 | 302 | 120 | X | COMPARATIVE EXAMPLE |

TABLE 4-continued

| | HONEYCOMB SPECIFICATION | | | | | | | | EVALUATION VALUE | | | |
|---|---|---|---|---|---|---|---|---|---|---|---|---|
| | CELL DENSITY cpi | HEIGHT h mm | WIDTH S mm | OBLATENESS S/h | RADIUS OF CURVATURE R1, R2 mm | PROTRUSION LENGTH OF PROTRUSION B1, B2 μm | ANGLE α degree | PHASE SHIFT L mm | T50 °C. | PRESSURE LOSS Pa | EVALUATION | REMARK |
| 186 | 278 | 0.43 | 5.20 | 12.0 | 2.20 | 0 | 5 | 3 | 298 | 203 | X | COMPARATIVE EXAMPLE |
| 187 | 400 | 0.36 | 4.33 | 12.0 | 2.20 | 0 | 5 | 2.5 | 295 | 287 | X | COMPARATIVE EXAMPLE |
| 188 | 625 | 0.29 | 3.46 | 12.0 | 2.20 | 0 | 5 | 2 | 292 | 457 | X | COMPARATIVE EXAMPLE |
| 189 | 1111 | 0.22 | 2.60 | 12.0 | 2.20 | 0 | 5 | 1.5 | 284 | 700 | X | COMPARATIVE EXAMPLE |

Figure 10:
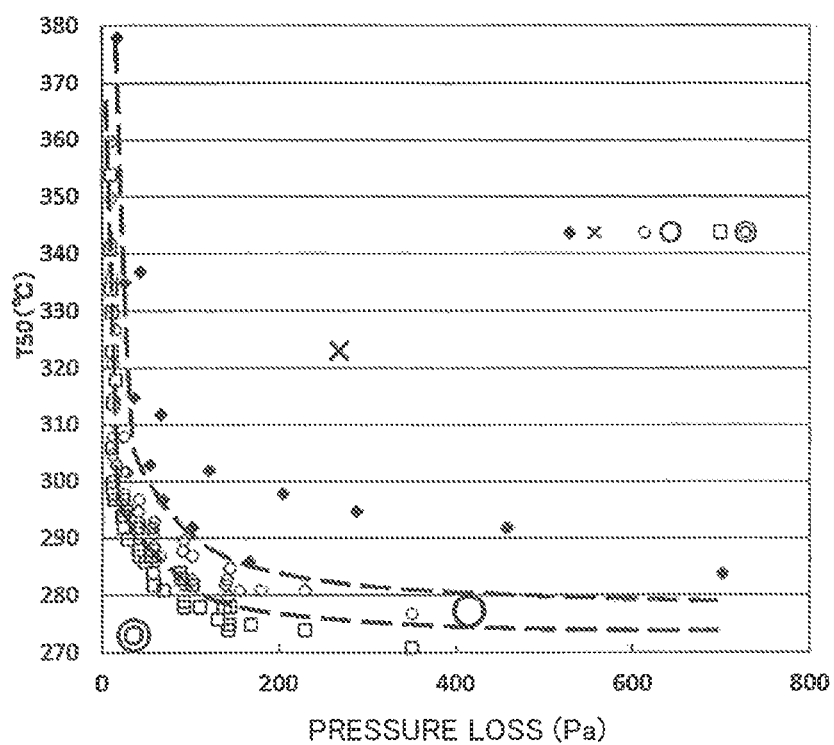
FIG. 10 is a graph on which each of Inventive Examples and each of Comparative Examples in Tables 3 and 4 are plotted.
Figure 11:
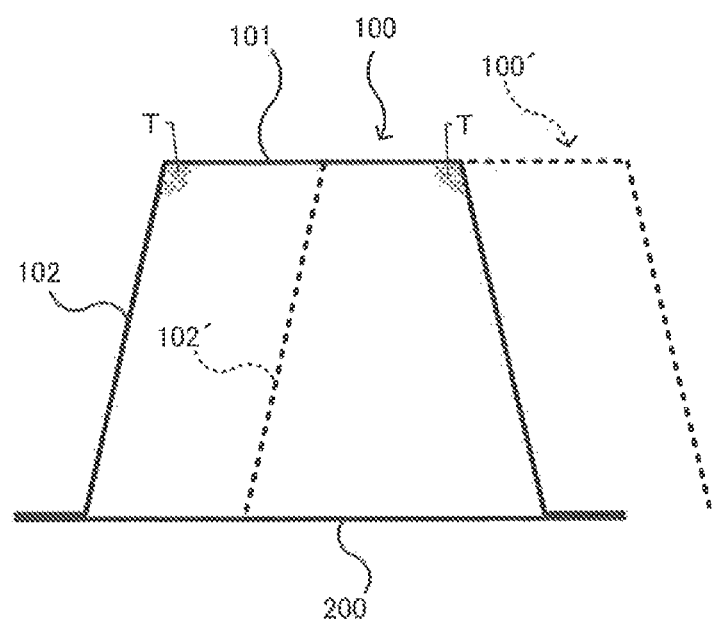
FIG. 11 is a cross-sectional view of a conventional corrugated foil.

FIG. 10 is a graph on which each of Inventive Examples and each of Comparative Examples in Tables 3 and 4 are plotted. A horizontal axis shows the pressure loss (Pa), and a vertical axis shows T50 (° C.). Two dashed lines are threshold value curves for judging the pressure loss (Pa) and T50 (° C.) (i.e., purification performance) to be good or poor. When data were plotted at a region represented by a double circle on a left side of the two threshold value curves, the comprehensive evaluation of pressure loss and purification performance was judged to be "excellent" (double circle). When data ware plotted at a region represented by a circle between the two threshold value curves, the comprehensive evaluation of pressure loss and purification performance was judged to be "good" (circle). When data were plotted at a region represented by a cross on a right side of the two threshold value curves, the comprehensive evaluation of pressure loss and purification performance was judged to be "poor" (cross). The threshold value curves were determined from experiments.

As shown in Examples described above, when the conditional expressions (1) to (3) were satisfied, the comprehensive evaluation of pressure loss and purification performance was "good." Further, when the comprehensive evaluations (4) and (5) were satisfied, pressure loss decreased further and purification performance enhanced further were achieved. At that time, the comprehensive evaluation of pressure loss and purification performance was "excellent."

The invention claimed is:

1. A honeycomb core for carrying a catalyst, comprising a flat metal foil and a corrugated metal foil, the flat metal foil and the corrugated metal foil being layered, wherein the corrugated foil is configured by repeating a concavo-convex shaped part including a first top surface that is in contact with one of the flat foils adjacent in a layering direction, a second top surface that is in contact with another flat foil adjacent in the layering direction and is disposed at a position where the second top surface avoids the first top surface as viewed in the layering direction, and an inclined leg surface that has one end connected to the first top surface through a first bent part and another end connected to the second top surface through a second bent part, and extends in a direction inclined with respect to the first top surface and the second top surface, and has an offset part having different wave phases between front and rear in an axial direction of the honeycomb core, the first bent part and the second bent part each have a R shape, a radius of curvature R1 of an inner edge of the first bent part and a radius of curvature R2 of an inner edge of the second bent part satisfy the following conditional expressions (1) and (2), respectively, and a separation distance h in the layering direction between the first top surface and the second top surface and a separation distance S between a pair of the inclined leg surfaces connected to the first top surface through the first bent parts satisfy the following conditional expression (3):

$$0.02(mm) \leq R1 \leq 2.0(mm) \tag{1},$$

$$0.02(mm) \leq R2 \leq 2.0(mm) \tag{2, and}$$

$$1.5 \leq S/h \leq 10 \tag{3}.$$

2. The honeycomb core for carrying a catalyst according to claim 1, wherein a first protrusion extends from both ends in the axial direction of the first bent part toward an exhaust gas flow channel that is disposed between the first top surface and the other flat foil as viewed in the axial direction, and a second protrusion extends from both ends in the axial direction of the second bent part toward an exhaust gas flow channel that is disposed between the second top surface and the one flat foil as viewed in the axial direction.

3. The honeycomb core for carrying a catalyst according to claim 2, wherein a protrusion length B1 of the first protrusion and a protrusion length B2 of the second protrusion satisfy the following conditional expressions (4) and (5), respectively:

$$2(\mu m) \leq B1 \leq 45(\mu m) \tag{4, and}$$

$$2(\mu m) \leq B2 \leq 45(\mu m) \tag{5}.$$

4. The honeycomb core for carrying a catalyst according to claim 1, wherein an inclination α of the inclined leg surface with respect to the layering direction satisfies the following conditional expression (6):

$$0.5° \leq \alpha \leq 15° \tag{6}.$$

5. The honeycomb core for carrying a catalyst according to claim 1, wherein a length L of the concavo-convex shaped part in the axial direction satisfies the following conditional expression (7):

$$0.5(mm) \leq L \leq 20(mm) \tag{7}.$$

6. The honeycomb core for carrying a catalyst according to claim 1, wherein the S is 0.5 (mm) or more and 10 (mm) or less, and the flat foil and the corrugated foil have a thickness of 5 (μm) or more and 100 (μm) or less.

7. The honeycomb core for carrying a catalyst according to claim 1, wherein the concavo-convex shaped parts are arranged in a zigzag pattern in the axial direction.

8. A catalytic converter comprising:
the honeycomb core for carrying a catalyst according to claim 1;
a catalyst carried on the honeycomb core for carrying a catalyst; and
an outer metal cylinder surrounding an outer circumference surface of the honeycomb core for carrying a catalyst.

9. The honeycomb core for carrying a catalyst according to claim 2, wherein an inclination α of the inclined leg surface with respect to the layering direction satisfies the following conditional expression (6):

$$0.5° \leq \alpha \leq 15° \tag{6}.$$

10. The honeycomb core for carrying a catalyst according to claim 3, wherein an inclination α of the inclined leg surface with respect to the layering direction satisfies the following conditional expression (6):

$$0.5° \leq \alpha \leq 15° \tag{6}.$$

11. The honeycomb core for carrying a catalyst according to claim 2, wherein a length L of the concavo-convex shaped part in the axial direction satisfies the following conditional expression (7):

$$0.5(mm) \leq L \leq 20(mm) \tag{7}.$$

12. The honeycomb core for carrying a catalyst according to claim 3, wherein a length L of the concavo-convex shaped part in the axial direction satisfies the following conditional expression (7):

$$0.5(mm) \leq L \leq 20(mm) \tag{7}.$$

13. The honeycomb core for carrying a catalyst according to claim 4, wherein a length L of the concavo-convex shaped part in the axial direction satisfies the following conditional expression (7):

$$0.5(mm) \leq L \leq 20(mm) \qquad (7).$$

14. The honeycomb core for carrying a catalyst according to claim 9, wherein a length L of the concavo-convex shaped part in the axial direction satisfies the following conditional expression (7):

$$0.5(mm) \leq L \leq 20(mm) \qquad (7).$$

15. The honeycomb core for carrying a catalyst according to claim 10, wherein a length L of the concavo-convex shaped part in the axial direction satisfies the following conditional expression (7):

$$0.5(mm) \leq L \leq 20(mm) \qquad (7).$$

16. The honeycomb core for carrying a catalyst according to claim 2, wherein the S is 0.5 (mm) or more and 10 (mm) or less, and the flat foil and the corrugated foil have a thickness of 5 ($\mu$m) or more and 100 ($\mu$m) or less.

17. The honeycomb core for carrying a catalyst according to claim 3, wherein the S is 0.5 (mm) or more and 10 (mm) or less, and the flat foil and the corrugated foil have a thickness of 5 ($\mu$m) or more and 100 ($\mu$m) or less.

18. The honeycomb core for carrying a catalyst according to claim 4, wherein the S is 0.5 (mm) or more and 10 (mm) or less, and the flat foil and the corrugated foil have a thickness of 5 ($\mu$m) or more and 100 ($\mu$m) or less.

19. The honeycomb core for carrying a catalyst according to claim 5, wherein the S is 0.5 (mm) or more and 10 (mm) or less, and the flat foil and the corrugated foil have a thickness of 5 ($\mu$m) or more and 100 ($\mu$m) or less.

20. The honeycomb core for carrying a catalyst according to claim 9, wherein the S is 0.5 (mm) or more and 10 (mm) or less, and the flat foil and the corrugated foil have a thickness of 5 ($\mu$m) or more and 100 ($\mu$m) or less.

* * * * *